US010433531B2

(12) United States Patent
Kawamata (10) Patent No.: US 10,433,531 B2
(45) Date of Patent: Oct. 8, 2019

(54) HANDLE ASSEMBLY FOR SPINNING REEL AND SPINNING REEL (71) Applicant: Shimano Inc., Sakai, Osaka (JP)

(72) Inventor: Atsushi Kawamata, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/118,067

(22) Filed: Aug. 30, 2018

(65) Prior Publication Data
US 2019/0116771 A1   Apr. 25, 2019

(30) Foreign Application Priority Data
Oct. 25, 2017   (JP) .................................. 2017-206344

(51) Int. Cl.
*A01K 89/01*   (2006.01)
*A01K 89/00*   (2006.01)

(52) U.S. Cl.
CPC ............ *A01K 89/006* (2013.01); *A01K 89/01* (2013.01)

(58) Field of Classification Search
CPC .......... A01K 89/006; A01K 89/011221; A01K 89/011223; A01K 89/01
See application file for complete search history.

(56) References Cited

U.S. PATENT DOCUMENTS

| 4,196,867 A * | 4/1980 | Miller | A01K 89/01 242/249 |
| 5,118,048 A * | 6/1992 | Childre | A01K 89/027 242/245 |
| 2002/0096587 A1 * | 7/2002 | Ikuta | A01K 89/00 242/319 |
| 2003/0205637 A1 * | 11/2003 | Nakajima | A01K 89/006 242/283 |
| 2004/0140385 A1 * | 7/2004 | Nishikawa | A01K 89/006 242/283 |
| 2004/0200917 A1 * | 10/2004 | Nishikawa | A01K 89/01 242/311 |
| 2006/0231657 A1 * | 10/2006 | Morise | A01K 89/0111 242/244 |
| 2007/0057105 A1 * | 3/2007 | Kitajima | A01K 89/0114 242/241 |

(Continued)

FOREIGN PATENT DOCUMENTS

JP   2010-158184 A   7/2010
WO   2017/212672 A1   12/2017

OTHER PUBLICATIONS

GB Search Report of corresponding GB Application No. 1817021.7 dated Apr. 9, 2019.

*Primary Examiner* — Emmanuel M Marcelo
(74) *Attorney, Agent, or Firm* — Global IP Counselors, LLP (57) ABSTRACT A handle assembly for a spinning reel includes a handle, a handle shaft, and a tubular member. The handle is configured to be rotated by a user. The handle shaft includes a distal-end portion screwed to a tubular gear shaft disposed in a gear that is built into a reel body, and a base-end portion onto which the handle is attached. The tubular member covers the handle shaft, the handle shaft has a flange between the distal-end portion and the base-end portion and at a position spaced apart from the base-end portion, and the tubular member has a first portion abutting the flange and a second portion abutting a shaft bearing of the gear shaft.

5 Claims, 5 Drawing Sheets (56) References Cited

U.S. PATENT DOCUMENTS

| | | | | |
|---|---|---|---|---|
| 2008/0149750 A1* | 6/2008 | Kitajima | ............... | A01K 89/01 |
| | | | | 242/224 |
| 2009/0072066 A1* | 3/2009 | Saito | ................. | A01K 89/0114 |
| | | | | 242/273 |
| 2010/0243781 A1* | 9/2010 | Hayashi | ............... | A01K 89/006 |
| | | | | 242/224 |
| 2010/0301150 A1* | 12/2010 | Law | .................... | A01K 89/006 |
| | | | | 242/283 |
| 2011/0233316 A1* | 9/2011 | Chan | ..................... | A01K 89/01 |
| | | | | 242/224 |

* cited by examiner

HANDLE ASSEMBLY FOR SPINNING REEL AND SPINNING REEL

CROSS-REFERENCE TO RELATED APPLICATIONS

This application claims priority to Japanese Patent Application No. 2017-206344, filed on Oct. 25, 2017. The entire disclosure of Japanese Patent Application No. 2017-206344 is hereby incorporated herein by reference.

BACKGROUND

Field of the Invention

The present invention relates to a handle assembly used in a spinning reel for fishing, and to a spinning reel.

Background Art

Spinning reels in which the handle assembly can be attached to/detached from the reel body are known in the prior art. In these reels, when the handle assembly is attached to the reel body, the handle shaft is screwed into a gear shaft that is built into the reel body. If the handle shaft is excessively screwed into the gear shaft, excess thrust from the handle shaft will be applied to the gear shaft, which causes buckling of the end portion of the gear shaft.

In order to eliminate such buckling, Japanese Published Unexamined Patent Application No. 2010-158184 (the JP'184 Publication) discloses a handle assembly comprising a tubular member 70 that covers the handle shaft (handle shaft portion 7) and that has a portion (buckling progress prevention portion 700 that abuts a shaft bearing 17 of the gear shaft (master gear shaft 10).

In the handle assembly disclosed in the JP'184 Publication, although buckling of the gear shaft can be prevented, the tubular member extends from the handle (handle arm 8) to the shaft bearing, and the length of the tubular member in the handle shaft direction is long. If the tubular member is long, inconveniences occur, such as the weight of the handle assembly being correspondingly heavy.

SUMMARY

An object of the present invention is to provide a handle assembly for a spinning reel with a short tubular member, and a spinning reel having such a handle assembly.

A first aspect of the present invention is directed to a handle assembly for a spinning reel according to a first aspect of the present invention comprising a handle (for example, a handle 121), a handle shaft (for example, a handle shaft 122) and a tubular member (for example, a tubular member 123). The handle can be rotated by an operation of a user. The handle shaft includes a distal-end portion (first male threaded portion 122AA or second male threaded portion 122AB) screwed into a tubular gear shaft (for example, a gear shaft 113A) disposed in a gear (for example, a drive gear 113) that is built into the reel body, and a base-end portion (for example, a base-end portion that is further toward the rear-end side of the handle shaft 122 than a second flange 122C) to which the handle is attached. The tubular member covers the handle shaft. The handle shaft has a flange (for example, a first flange 122B) between the distal-end portion and the base-end portion and in a position spaced apart from the base-end portion, and the tubular member has a first portion (for example, a protrusion 123B) that abuts the flange, and a second portion (for example, a distal-end portion 123E) that abuts the shaft bearing (for example, a ball bearing 114B) of the gear shaft.

Figure 1:
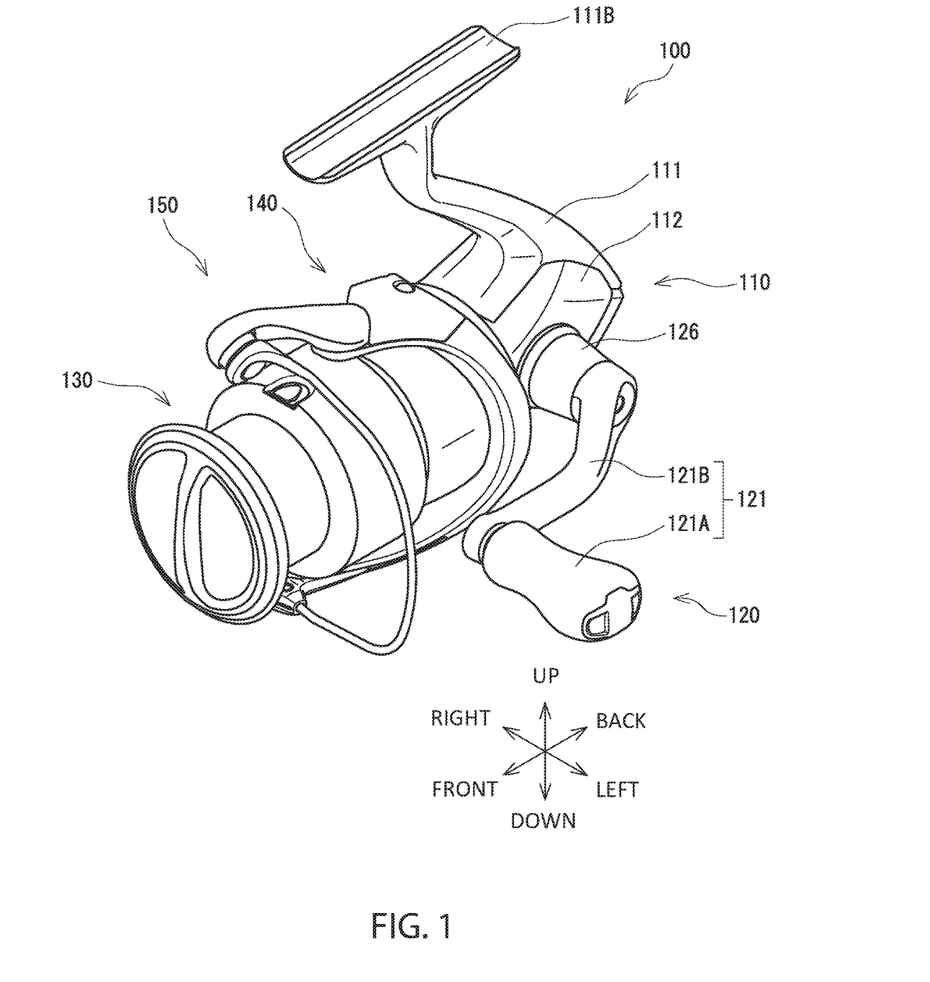
FIG. 1 is a perspective view of a spinning reel according to an embodiment of the present invention.

According to the above-described configuration, because the tubular member has a first portion that abuts the flange that is disposed in a position spaced apart from the base-end portion, it is not necessary for the tubular member extend to the base-end portion of the handle shaft, so that it is possible to shorten the length of the tubular member in the axial direction of the handle shaft (left-right direction in FIG. 1, etc.).

The reel body can include a housing (for example, first housing member 111 and second housing member 112) that forms an accommodation space (for example, accommodation space S) that houses the gear and into which the handle shaft is inserted.

Figure 2:
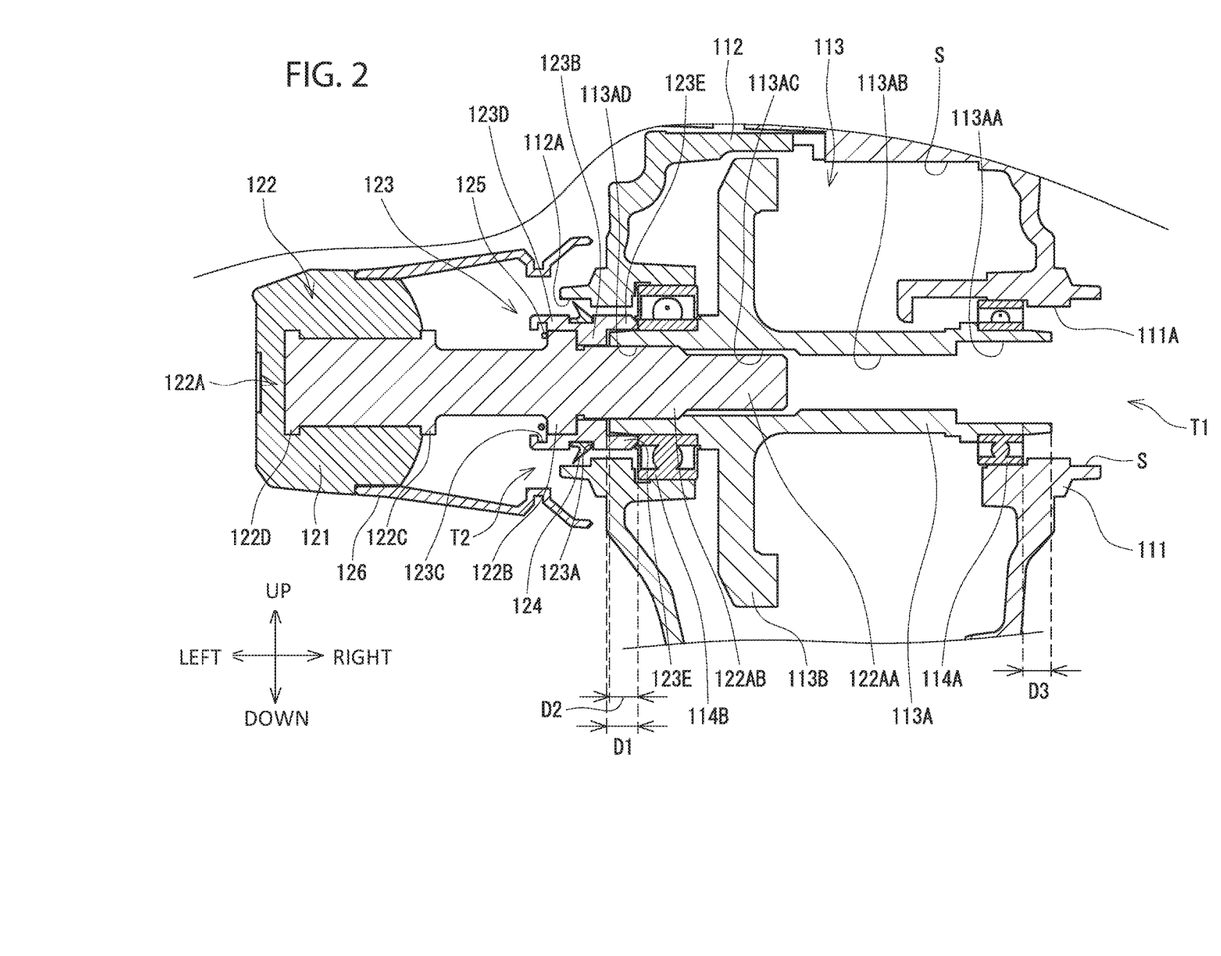
FIG. 2 shows a cross section of the spinning reel according to an embodiment of the present invention taken through a plane that extends in the vertical and lateral directions and that passes through the handle shaft.

The flange can be located in a position in which at least a part of the flange enters the accommodation space (for example, as shown in FIG. 2, the first flange 122B enters the space of a through-hole 112A, which is a part of the accommodation space S).

According to the above-described configuration, the flange is disposed near the shaft bearing, and the tubular member can be further shortened.

The tubular member can have a recess on an inner surface thereof (for example, a recess 123C), and the handle assembly can further comprise a retaining member (for example, a retaining spring 125) that prevents the tubular member from being pulled off the handle shaft by a portion thereof entering the recess and another portion thereof abutting the flange.

According to the above-described configuration, it is possible to prevent the tubular member from falling off the handle shaft when the handle assembly is detached.

The tubular member can include a through-hole (for example, a through-hole H3) that penetrates the outer side and the inner side, the flange can have a coupling hole (for example, a coupling hole H2) that communicates with the through-hole, and the handle assembly can include a rod-pin (for example, a rod-pin H1) that passes through the through-hole and reaches the interior of the coupling hole.

According to the above-described configuration, it is possible to prevent the tubular member from falling off the handle shaft when the handle assembly is detached.

A spinning reel according to a second aspect of the present invention comprises a handle assembly for a spinning reel, and the reel body that incorporates a gear.

According to the above-described configuration, it is possible to shorten the length of the tubular member.

According to the present invention, it is possible to provide a handle assembly for a spinning reel with a short tubular member, and a spinning reel having such a handle assembly.

DETAILED DESCRIPTION OF THE EMBODIMENTS

The spinning reel 100 for fishing according to the first embodiment of the present invention will be described below with reference to the drawings. In the description below, when the spinning reel 100 is attached to a fishing rod, the distal end direction of the fishing rod (direction in which the fishing line is paid out or cast from the spinning reel 100) is referred to as the "front," the rear end direction of the fishing rod is referred to as the "rear," the direction of the fishing rod as viewed from the spinning reel 100 is referred to as "up," the opposite direction is referred to as "down," and "right" and "left" refers to the "right" and the "left" of a user that holds the fishing rod. Additionally, in FIG. 2, the gear teeth are omitted. In addition, in the drawings, members are omitted as is suitable for clarification of the positional relationships between each of the members. Additionally, the threading is also omitted from the drawings.

Schematic Configuration of the Spinning Reel 100

As shown in FIG. 1, the spinning reel 100 comprises a reel body 110, a handle assembly 120, a spool 130, a rotor 140, and a bail arm 150. The reel body 110 comprises a drive mechanism that rotates the rotor 140 relative to the reel body 110 in conjunction with the rotation of the handle 121 of the handle assembly 120, and that moves the spool 130 back and forth relative to the reel body 110. A fishing line is wound around the spool 130. The bail arm 150 is attached to the rotor 140 so as to be pivotable between a line-winding position for winding the fishing line around the spool 130, and a line-releasing or casting position for releasing (paying out) the fishing line from the spool 130. The bail arm 150 rotates relative to the reel body 110 together with the rotor 140.

Reel Body 110

The reel body 110 constitutes the main body of the spinning reel 100. As shown in FIGS. 1 and 2, the reel body 110 comprises a first housing member 111, a second housing member 112, a drive gear 113, and ball bearings 114A and 114B. The reel body 110 also comprises a rotation transmission mechanism (configured to include, for example, a pinion gear that meshes with the drive gear 113, etc.) for transmitting the rotation of the drive gear 113 to the rotor 140, an oscillation mechanism for moving the spool 130 back and forth by receiving the rotation of the drive gear 113, and the like (not shown in the figures). A first attachment part T1 and a second attachment part T2, to which the handle assembly 120 is attached, are disposed on the left and right of the reel body 110; in FIG. 1, the handle assembly 120 is attached to the second attachment part T2. In the description below, the handle assembly 120 is assumed to be attached to the second attachment part T2, unless indicated otherwise.

The first housing member 111 comprises a through-hole 111A, into which a handle shaft 122, described further below, is inserted at the time that the handle assembly 120 is attached to the first attachment part T1, and a reel foot 111B that is attached to the fishing rod. The second housing member 112 comprises a through-hole 112A, into which the handle shaft 122, described further below, is inserted (in FIG. 1, etc., the handle shaft 122 has already been inserted), at the time that the handle assembly 120 is attached to the second attachment part T2. Of the through-hole 111A and the through-hole 112A, the through-hole to which the handle assembly 120 is not attached is normally covered by a cover (not shown).

The first housing member 111 and the second housing member 112 are combined by a bolt, or the like, and constitute the housing of the reel body 110. The housing forms an accommodation space S for housing a drive gear 113, ball bearings 114A and 114B, a rotation transmission mechanism, an oscillation mechanism, a portion of the handle shaft 122 (the portion that enters into the housing), and the like. The accommodation space S also includes the through-hole 111A and the through-hole 112A spaces (for inserting the handle shaft 122).

The drive gear 113 comprises a cylindrical gear shaft 113A, and a disc-shaped gear portion 113B that is integrally formed with the gear shaft 113A and that meshes with the pinion gear, and the like. The right-end portion of the gear shaft 113A is rotatably supported by a ball bearing 114A (shaft bearing) that is disposed inside the first housing member 111. The left-end portion of the gear shaft 113A is rotatably supported by a ball bearing 114B (shaft bearing) that is disposed inside the second housing member 112. The gear shaft 113A has a first inner surface 113AA to a fourth inner surface 113AD at both ends. Details of the first inner surface 113AA to the fourth inner surface 113AD will be described together with the handle shaft 122 of the handle assembly 120 further below. As will be described in more detail below, the handle shaft 122 is attached to the gear shaft 113A. The handle shaft 122 rotates the drive gear 113 by rotating together with the handle 121.

Handle Assembly 120

Figure 3:
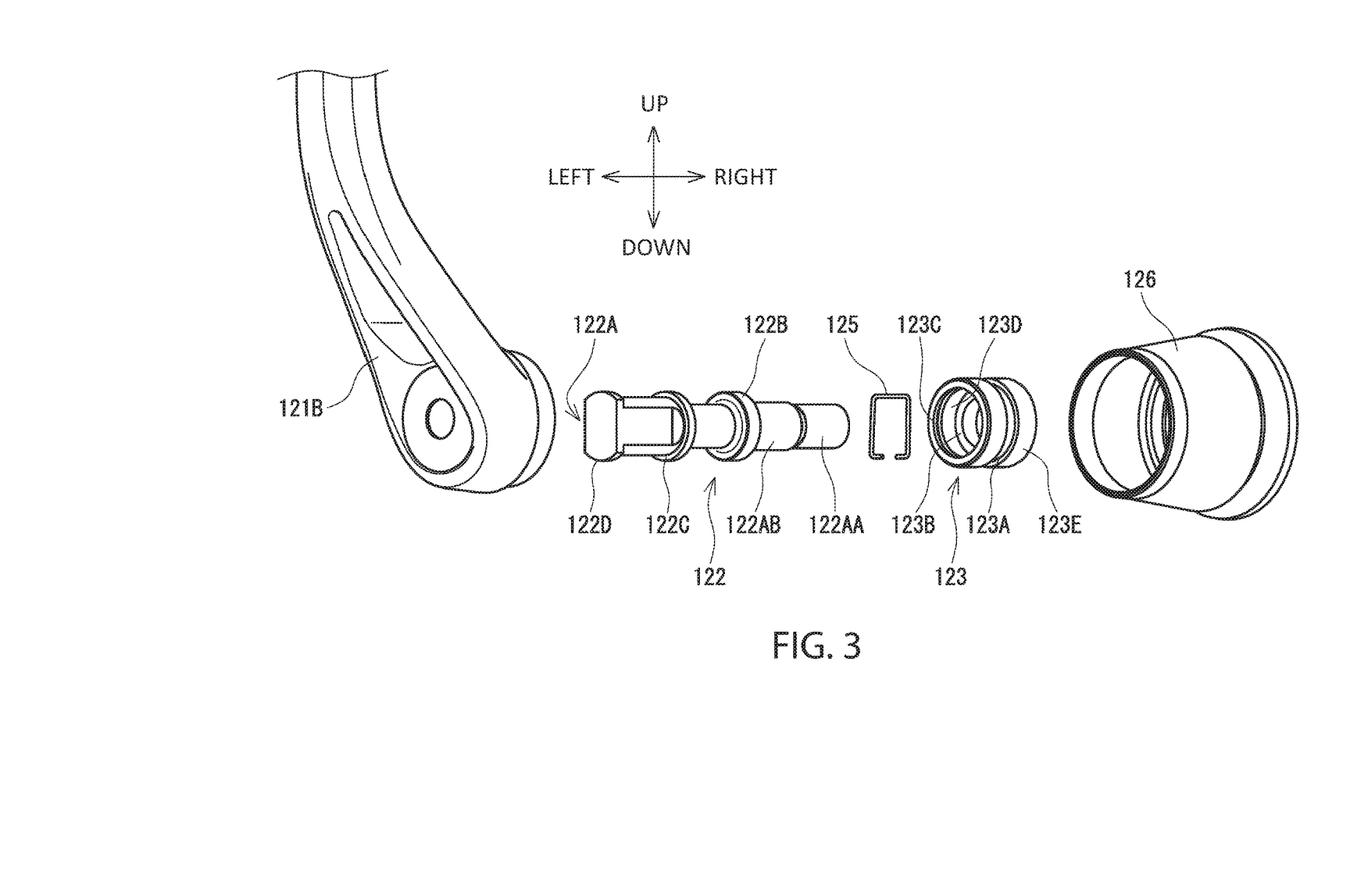
FIG. 3 is an exploded perspective view of a handle assembly according to an embodiment of the present invention.

As shown in FIGS. 2 and 3, the handle assembly 120 comprises a handle 121, a handle shaft 122, a tubular member 123, a lip seal member 124 (omitted in FIG. 3), a retaining spring 125, and a cover 126.

The handle 121 includes a handle (handle knob) 121A that is held by the user at the time of operation, and a handle arm 121B that supports the handle 121A. The handle 121 is connected to the handle shaft 122, and the handle shaft 122 rotates in conjunction with the rotation of the handle 121.

The handle shaft 122 comprises a rod-like handle shaft body 122A and a first flange 122B to a third flange 122D, which project radially outward from the handle shaft body 122A. The above-described elements are integrally formed.

The handle shaft body 122A comprises a first male threaded portion 122AA and a second male threaded portion 122AB, on which threads have been cut. The first male threaded portion 122AA and the second male threaded portion 122AB are the right-end portions (distal-end portions) of the handle shaft body 122A. Between the first male threaded portion 122AA and the second male threaded portion 122AB, the first male threaded portion 122AA has a smaller diameter and is positioned on the distal-end side (right side) of the handle shaft body 122A.

When the handle assembly 120 is attached to the first attachment part T1, the handle shaft 122 is inserted into the through-hole 111A. The inner surface 113AA of the gear shaft 113A of the drive gear 113 is not threaded, and the inner surface 113AA has a larger diameter than the second male threaded portion 122AB (the inner surface 113AA does not interfere with the second male threaded portion 122AB). On the other hand, the inner surface 113AB is threaded, and the inner surface 113AB forms a female threaded portion that is screwed together with the first male threaded portion 122AA. Therefore, when attaching the handle assembly 120 to the first attachment part T1, the handle shaft 122 is inserted into the through-hole 111A, and the handle shaft 122 is rotated and pushed into the left side (screwed in) so that the first male threaded portion 122AA is screwed together with the inner surface 113AB. The threads that are formed on the inner surface 113AB and the first male threaded portion 122AA are cut in a direction such that the direction in which the handle shaft 122 is screwed on is the same as the direction in which the fishing line is wound around the spool 130.

When the handle assembly 120 is attached to the second attachment part T2, the handle shaft 122 is inserted into the through-hole 112A. The inner surface 113AC of the gear shaft 113A of the drive gear 113 is not threaded, and the inner surface 113AC has a larger diameter than the first male threaded portion 122AA (the inner surface 113AC does not interfere with the first male threaded portion 122AA). The inner surface 113AD is threaded, and the inner surface 113AD forms a female threaded portion that is screwed together with the second male threaded portion 122AB. Therefore, when attaching the handle assembly 120 to the second attachment part T2, the handle shaft 122 is inserted into the through-hole 112A, and the handle shaft 122 is rotated and pushed into the right side (screwed in) such that the second male threaded portion 122AB is screwed together with the inner surface 113AD. The threads that are formed on the inner surface 113AD and the second male threaded portion 122AB are cut in a direction such that the direction in which the handle shaft 122 is screwed on is the same as the direction in which the fishing line is wound around the spool 130.

With the configuration described above, when the handle shaft 122 is screwed on, it is possible to have a different direction of rotation for attaching the handle assembly 120 to the first attachment part T1 than for attaching the handle assembly 120 to the second attachment part T2, and the handle assembly 120 can be suitably attached to the reel body 110.

The first flange 122B has an annular shape with a rectangular cross section. A protrusion 123C of the tubular member 123, which will be described below, abuts the first flange 122B (described in detail below). The first flange 122B is positioned between the second male threaded portion 122AB and the second flange 122C, closer to the second male threaded portion 122AB. Furthermore, the first flange 122B is formed in a position in which a portion thereof enters the accommodation space S (here, the through-hole 111A or 112A). In this manner, the first flange 122B is disposed in the vicinity of the second male threaded portion 122AB. It is not necessary for the threads of the second male threaded portion 122AB to extend to the first flange 122B.

The handle 121 is attached to the base-end portion that is further toward the rear-end side of the handle shaft 122 than the second flange 122C. The third flange 122D is disposed on that base-end portion, and the third flange 122D prevents the handle shaft 122 from being removed from the handle 121. The base-end portion is disposed so as to be spaced apart from the first flange 122B. The second flange 122C is used as a flange that prevents the handle shaft 122 from entering too far into the handle 121. The handle shaft 122 may be attached to the handle 121 by a bolt, or the like.

The tubular member 123 covers the handle shaft 122 and is cylindrical in shape.

An annular recess 123A with a rectangular cross section is formed in the middle of the left-right direction (rotational axis direction of the handle shaft 122) of the outer circumferential surface of the tubular member 123. An annular lip seal member 124 is fitted into the recess 123A. The lip seal member 124 is in contact with the inner surface of the through-hole 112A of the second housing member 112 (or the through-hole 111A of the first housing member 111), and seals the gap between the inner surface of the through-hole 112A (or the through-hole 111A) and the tubular member 123. It is thus possible to prevent the intrusion of water into the reel body 110.

An annular protrusion 123B with rectangular cross section is formed in the center of the left-right direction of the inner circumferential surface of the tubular member 123. The first flange 122B abuts the left-side surface of the protrusion 123B. Also, an annular recess 123C with rectangular cross section is formed at the left-end portion of the inner circumferential surface of the tubular member 123. A quadrangular retaining spring 125 is fitted into the recess 123C. Since the retaining spring 125 is quadrangular, it also abuts the first flange 122B. Due to this configuration, the first flange 122B is sandwiched between the protrusion 123B and the retaining spring 125 in the left-right direction. The tubular member 123 is thereby retained and is regulated so as to be immovable in the axial direction with respect to the handle shaft 122. A cylindrical portion 123D of the tubular member 123 between the protrusion 123B and the recess 123C is formed with a cylindrical shape that is in contact with the outer circumferential surface of the first flange 122B.

The distal-end portion (right-end portion) 123E of the tubular member 123 is a cylindrical portion that is positioned further toward the distal end side (right side) of the handle shaft 122 than the protrusion 123B of the tubular member 123. The length D1 of the distal-end portion 123E in the left-right direction is longer than the length (D2) in the left-right direction between the left end of the gear shaft 113A of the drive gear 113 and the left end of the ball bearing 114B. The length D1 is longer than the length D3. D2=D3 in the left-right direction between the right end of the gear shaft 113A of the drive gear 113 and the right end of the ball bearing 114A.

The outer circumferential surface of the handle shaft body 122A of the handle shaft 122 is in contact with the inner circumferential surface of the protrusion 123B. Furthermore, the outer circumferential surface of the first flange 122B of the handle shaft 122 is in contact with the inner circumferential surface of the cylindrical portion 123D. In addition, the distal end of the distal-end portion 123E of the tubular member 123 abuts and is in contact with the inner race of the ball bearing 114A. When the handle shaft 122 rotates, the tubular member 123 also rotates due to the friction of each of the contact portions. A matching convexity and a concavity can be provided in the contact portion of the handle shaft 122 and the contact portion of the tubular member 123, respectively, such that the handle shaft 122 and the tubular member 123 are rotationally fixed. Alternatively, the tubular member 123 may engage the gear shaft 113A so as to rotate together with the drive gear 113. For example, a convexity and a concavity (for example, a matching groove and protrusion that extend in the left-right direction) can be respectively disposed in the distal-end portion 123E and the gear shaft 113A such that the drive gear 113 and the tubular member 123 are rotationally fixed.

The handle 121 is fitted to the left-end portion of the cover 126, and the cover 126 covers the vicinity of the first attachment part T1 or the second attachment part T2 when the handle assembly 120 is attached to the first attachment part T1 or the second attachment part T2 of the reel body 110.

Attachment of the Handle Assembly 120 to the Reel Body 110

An embodiment in which the handle assembly 120 is attached to the second attachment part T2 of the reel body 110 will be described below with reference to FIG. 2. The member names for the embodiment in which the handle assembly 120 is attached to the first attachment part T1 are shown in parentheses. First, the first flange 122B of the handle shaft 122 is sandwiched between the protrusion 123B of the tubular member 123 and the retaining spring 125 to attach the tubular member 123 to the handle shaft 122. The handle shaft 122 is then attached to the handle 121 together with the cover 126. The handle shaft 122 is then inserted into the through-hole 112A of the second housing member 112 (through-hole 111A of the first housing member 111), and the handle shaft 122 is rotated and screwed into the gear shaft 113A of the drive gear 113 such that the second male threaded portion 122AB (first male threaded portion 122AA) is screwed together with the inner surface 113AD (inner surface 113AB). As the handle shaft 122 is screwed in, the tubular member 123 also moves in the screwing direction, i.e., to the right side (left side). Then, before the protrusion 123B of the tubular member 123 strikes the left end (right end) of the gear shaft 113A of the drive gear 113, the distal-end portion 123E of the tubular member 123 abuts the inner race of the ball bearing 114B (ball bearing 114A). This is because the above-described length D1 is greater than the above-described length D2 (D3). After abutment, the handle shaft 122 does not move any farther to the right side (left side) even if the screwing operation is carried out. Therefore, the tubular member 123 does not press the left-end portion (right-end portion) of the gear shaft 113A due to excessive screwing of the handle shaft 122, and therefore it is possible to prevent buckling of the gear shaft 113A due to an excessive screwing of the handle shaft 122.

Effects of the Embodiment

In the embodiment described above, because a first flange 122B that is positioned away from the base-end portion (attachment part of the handle 121) of the handle shaft 122 on the distal-end side of the base-end portion is added to the handle shaft such that the first flange 122B abuts the tubular member 123 (protrusion 123B), the length of the tubular member 123 is short. In particular, because the first flange 122B is positioned in the vicinity of the second male threaded portion 122AB, the length of the tubular member 123 is significantly short in this embodiment. In the above-described embodiment, a portion of the first flange 122B enters the accommodation space S (here, the through-hole 111A or 112A), but all of the first flange 122B may enter the accommodation space S as well. The length of the tubular member 123 can thereby be shorter. Also, the tubular member 123 can be regulated so as to be immovable in the axial direction with respect to the handle shaft 122 by sandwiching the first flange 122B of the handle shaft 122 between the protrusion 123B of the tubular member 123 and the retaining spring 125. It is thereby possible to prevent the tubular member 123 from inadvertently moving relative to the handle shaft 122. In particular, because the retaining spring 125 restricts the tubular member 123 from moving toward the distal end side of the handle shaft 122, it is possible to prevent the tubular member 123 from falling off the handle shaft 122 during detachment of the handle assembly 120.

Modified Examples

The present invention is not limited to the embodiment described above. Various modifications can be made to the above-described embodiment. For example, the shape of each member described above can be appropriately changed. For example, the ball bearings 114A and 114B may be changed to other types of shaft bearings. The position of the first flange 122B may be farther toward the rear-end side of the handle shaft 122 than in FIG. 2.

Figure 4:
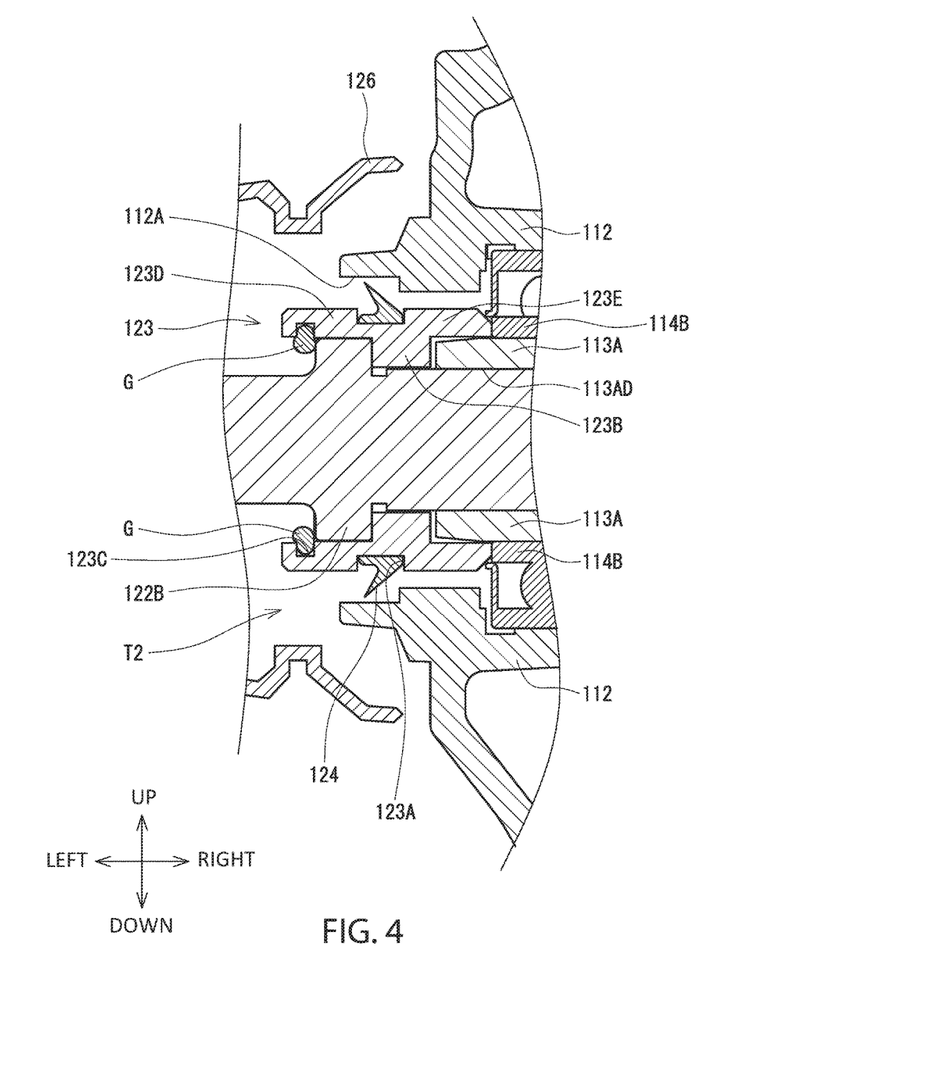
FIG. 4 shows an enlarged cross section of a handle assembly according to a modified example.

The retaining spring 125 may be changed to another retaining element in which a portion thereof enters the recess 123C and another portion thereof abuts the tubular member 123. For example, as shown in FIG. 4, an annular elastic member G such as an O-ring may be used instead of the retaining spring 125. A portion of the elastic member G is fitted into the recess 123C of the tubular member 123, and the elastic member G presses the left-side surface of the first flange 122B such that the left-side surface and the inner wall surface of the recess 123C become flush. As a result, the first flange 122B of the handle shaft 122 is sandwiched between the protrusion 123B of the tubular member 123 and the elastic member G, and the tubular member 123 can be regulated so as to be immovable in the axial direction with respect to the handle shaft 122. Furthermore, as an action of the elastic member G alone, because the elastic member restricts the tubular member 123 from moving to the distal end side of the handle shaft 122, it is possible to prevent the tubular member 123 from falling off the handle shaft 122 during detachment of the handle assembly 120. Furthermore, if an elastic member G is employed, it is possible to suppress the rattling caused by a clearance between the retaining member (for example, retaining spring 125) and the tubular member 123.

Figure 5:
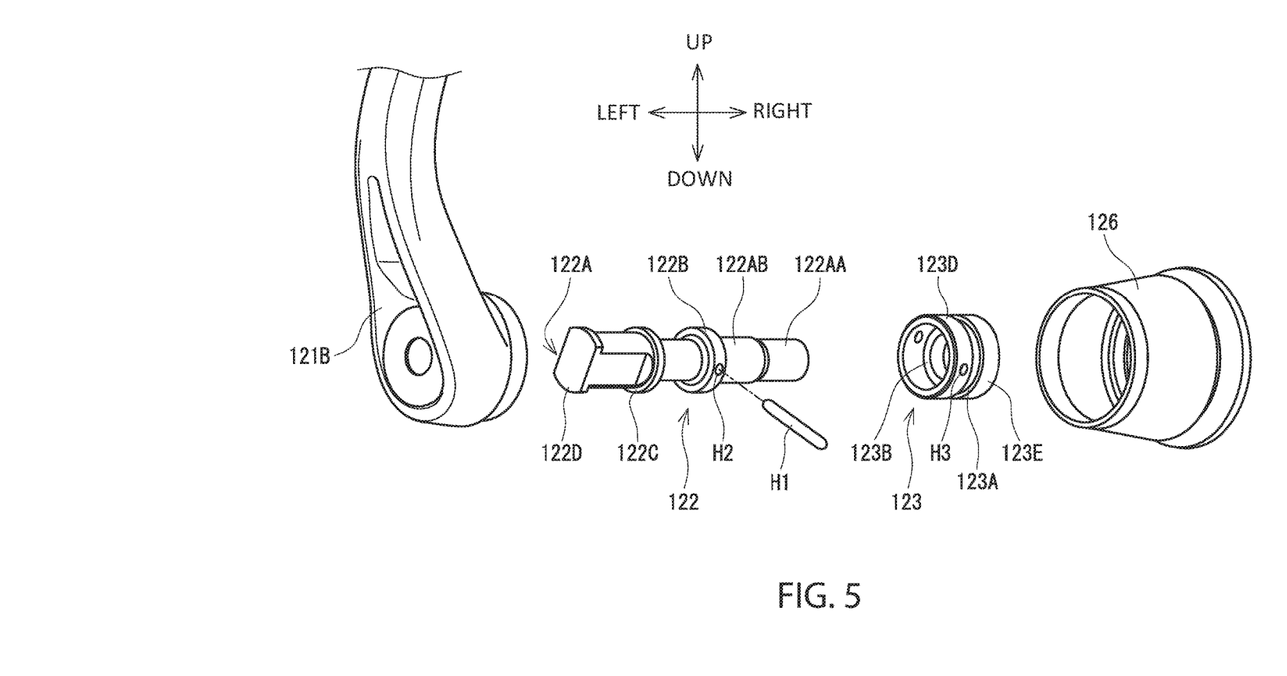
FIG. 5 is an exploded perspective view of the handle assembly according to a modified example.

Instead of regulating the tubular member 123 so as to be immovable in the axial direction with respect to the handle shaft 122 by the retaining spring 125, the tubular member 123 may be fixed to the handle shaft 122 by a rod-pin H1, such as a pin, as shown in FIG. 5. In this embodiment, the tubular member 123 is fixed to the handle shaft 122 by forming a through-hole H3 on the tubular member 123, forming a through-hole H2 that communicates with the through-hole H3 on the handle shaft 122, and inserting the rod-pin H1 therein.

What is claimed is:

1. A handle assembly for a spinning reel, comprising:
   a handle configured to be rotated by a user;
   a handle shaft including a distal-end portion screwed to a tubular gear shaft of a gear being disposed in a reel body, and a base-end portion attached to the handle; and
   a tubular member covering the handle shaft,
   wherein the handle shaft having a flange between the distal-end portion and the base-end portion and at a position spaced apart from the base-end portion, and
   the tubular member having a first portion abutting the flange and a second portion abutting a shaft bearing of the gear shaft.

2. The handle assembly for a spinning reel according to claim 1, wherein
   the reel body comprises a housing that forms an accommodation space housing the gear and into which the handle shaft is inserted, and
   the flange is disposed such that at least a portion thereof enters the accommodation space.

3. The handle assembly for a spinning reel according to claim 1, wherein
   the tubular member has a recess on an inner surface thereof, and
   the handle assembly further comprises a retaining member which has a first portion entering the recess, and a second portion abutting the flange, so as to prevent the tubular member from being pulled off the handle shaft.

4. The handle assembly for a spinning reel according to claim 1, wherein the tubular member has a through-hole penetrating an outer side thereof and an inner side thereof, the flange has a coupling hole communicating with the through-hole, and the handle assembly further comprises a rod-pin passing through the through-hole and extending to an interior of the coupling hole.

5. A spinning reel, comprising:

the handle assembly for a spinning reel according to claim 1; and the reel body housing the gear.

* * * * *